United States Patent

[11] 3,632,263

| [72] | Inventor | Hubert Blanchard<br>Le Havre, France |
|---|---|---|
| [21] | Appl. No. | 839,198 |
| [22] | Filed | July 7, 1969 |
| [45] | Patented | Jan. 4, 1972 |
| [73] | Assignee | Sidel, Societe Anonyme<br>Le Havre, France |
| [32] | Priority | July 8, 1968 |
| [33] | | France |
| [31] | | 158.303 |

[54] DEVICES FOR BLOWING THERMOPLASTIC HOLLOW BODIES
9 Claims, 6 Drawing Figs.

[52] U.S. Cl. .................................................. 425/324,
425/387, 425/395, 425/405
[51] Int. Cl. .................................................. B29d 23/03
[50] Field of Search .......................................... 18/5 BA

[56] References Cited
UNITED STATES PATENTS

| 3,205,287 | 9/1965 | Settembrini .................. | 18/5 X |
| 3,272,896 | 9/1966 | Winchester .................. | 18/5 X |
| 3,488,803 | 1/1970 | Cote ........................... | 18/5 |

*Primary Examiner*—Travis S. McGehee
*Attorneys*—Robert E. Burns and Emmanuel J. Lobato

ABSTRACT: Device for blowing a hollow thermoplastic body manufactured according to the extrusion-blowing process from a continuous vertically extruded tubular parison cut into sections enclosed into separate split moulds disposed beneath the extrusion head. This device is characterized in that a blowing chamber of relatively reduced dimensions is formed in the two mould halves or sections and adapted to retain therein one open end of the parison section when the mould is closed, and that a compressed-gas injection nozzle connected to a source of compressed gas opens into said blowing chamber and is so arranged that the gaseous jet issuing from said nozzle is directed towards said open end of the parison.

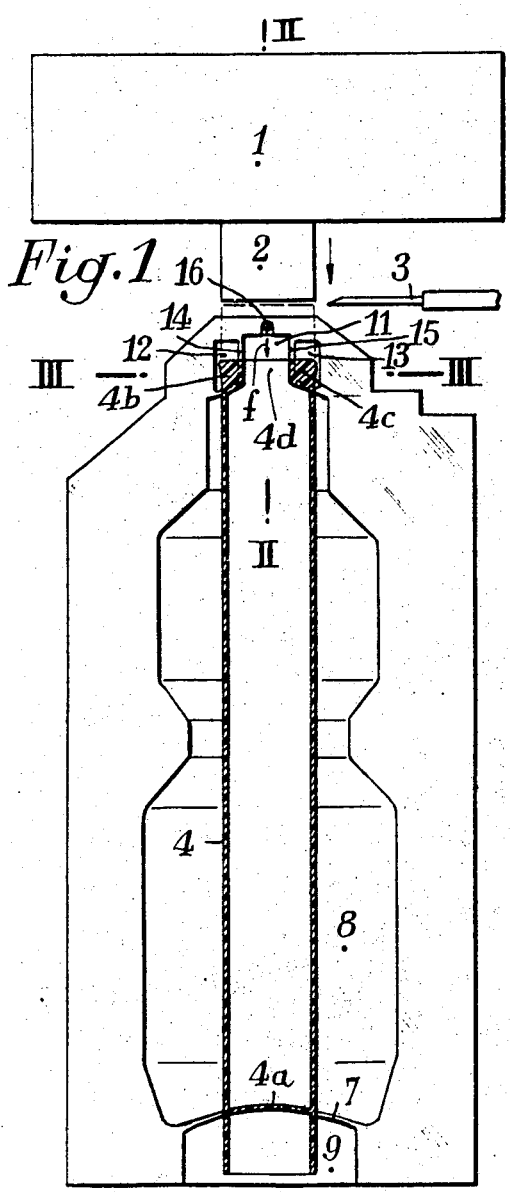
Fig.1
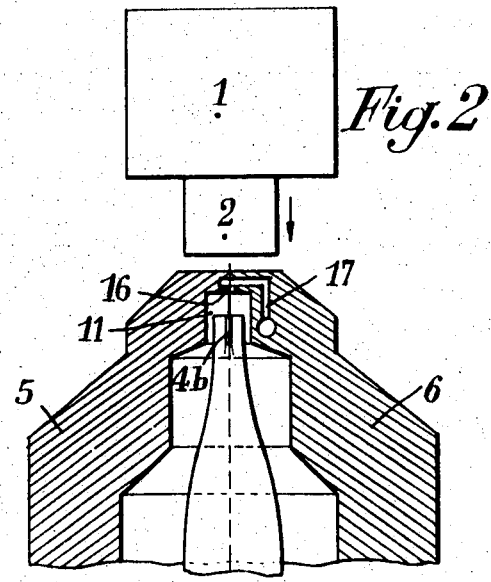
Fig.2
Fig.3
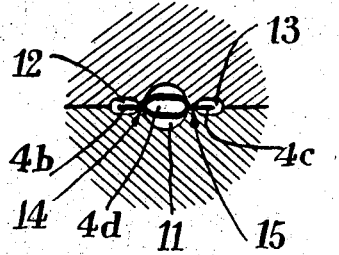
Fig.4
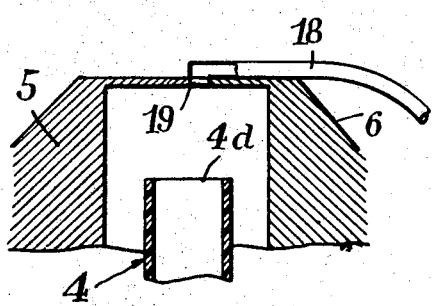
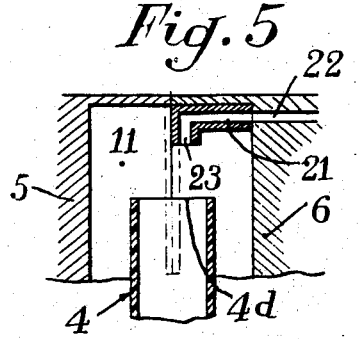
Fig.5

DEVICES FOR BLOWING THERMOPLASTIC HOLLOW BODIES

BACKGROUND OF THE INVENTION

The present invention relates to devices for blowing thermoplastic hollow articles manufactured according to the well-known extrusion-blowing process.

In general, in the manufacture of thermoplastic hollow bodies by this extrusion-blowing process, a continuous tubular parison is produced and cut into sections subsequently introduced into split molds. When each one of the molds enclosing such parison is closed, a compressed gas (generally air) is introduced into the parison for causing same to take the shape of the mold impression or cavity, this shape being preserved by the article during the subsequent cooling thereof.

Various devices are already known which permit of introducing air under pressure into a parison enclosed in a mold. Among these devices two main types may be cited: thus, one type utilizes a hollow dart or needle for perforating and inflating the parison wall, or a blowing nozzle inserted axially into the parison either before or after closing the mold, and another type utilizes a blowing head brought to its operative position by mechanical means subsequent to the mold closing operation.

All these known blowing devices are attended by various inconveniences, mainly that of requiring complementary equipment mounted on the mold for controlling the displacement, for blowing purposes, of a hollow needle or nozzle, or a blowing head assembly.

SUMMARY OF THE INVENTION

It is the essential object of the present invention to avoid this inconvenience by providing a parison blowing device whereby any additional movable member is definitely eliminated from the mold.

To this end, the device according to the present invention for blowing a hollow thermoplastic body manufactured according to the extrusion-blowing process from a continuous vertically extruded tubular parison cut into sections enclosed into separate split molds disposed beneath the extrusion head, is characterized in that a blowing chamber of relatively reduced dimensions is formed in the two mold halves or sections and adapted to retain therein one open end of the parison section when the mold is closed, and that a compressed-gas injection nozzle connected to a source of compressed gas opens into said blowing chamber and is so arranged that the gaseous jet issuing from said nozzle is directed towards said open end of the parison.

The blowing device according to this invention is attended by many advantageous features. Firstly, it permits of dispensing with any control means such as pneumatic cylinders for controlling the positioning of a blowing nozzle or head. Besides, the movable blowing nozzle or head is eliminated, thus affording a substantial reduction in the weight of each mold. Furthermore, the gas can be blown directly beneath the extrusion head, thus avoiding the collapse of said soft parison by virtue of its inherent weight during the mold movement until the initial blowing position is attained. Thus, the contact time between the thermoplastic material and the mold is increased, whereby higher production rates can be obtained.

The device according to this invention is also advantageous in that it permits of performing blowing operations into multi-impression molds without unduly multiplying the mechanism elements.

BRIEF DESCRIPTION OF THE DRAWING

In order to afford a clearer understanding of this invention various forms of embodiment thereof will now be described by way of example with reference to the attached drawing:

FIG. 1 is a vertical section taken along the joint plane of a mold just after the closing thereof, in the case of a blowing operation directed from the top of the mold;

FIG. 2 is a vertical section taken along the line II—II of FIG. 1;

FIG. 3 is a horizontal section taken along the line III—III of FIG. 1;

FIG. 4 is a fragmentary section showing a modified form of embodiment of the blowing device;

FIG. 5 is another fragmentary section showing a further modified form of embodiment of the blowing device;

DESCRIPTION OF THE PREFERRED EMBODIMENT

Figure 6:
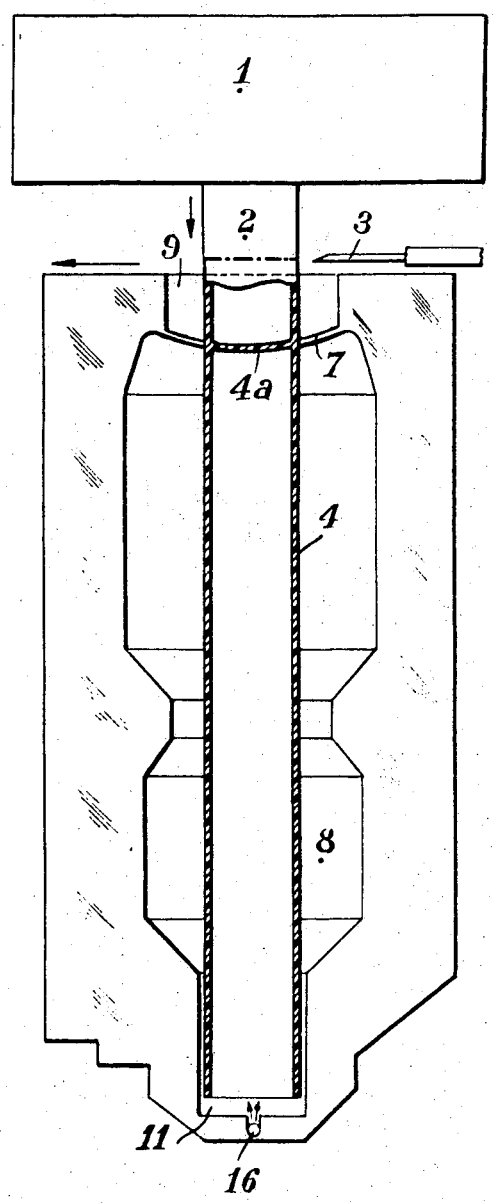
FIG. 6 is a vertical section taken along the vertical joint plane of a closed mold, in the case of a blowing operation directed into the lower portion of the mold.

Referring first to FIG. 1, the reference numeral 1 designates an extrusion head 1 attached to an extruder of any known type. This extrusion head 1 delivers continuously from its lower portion a tubular parison 2 of thermoplastic material in a relatively soft condition. This parison 2 extruded continuously in a vertical direction is cut at spaced intervals into sections of predetermined length by a cutter 3 consisting for example of a horizontal blade of any known and suitable type.

FIG. 1 also shows a parison section 4 detached by the cutter 3 from the continuous parison 2 issuing from the extrusion head 1. This parison section 4 is shown as being held between the two halves 5 and 6 of a split mold, which are movable in relation to each other in a direction at right angles to the extrusion axis, i.e., horizontally, beneath the extrusion head 1. In the figure the mold is shown in its open condition, that is, with its two halves 5 and 6 somewhat spaced from each other. Thus, the extruded parison lies between the two mold halves 5 and 6. When the cutter 3 is operated, the section 4 is still attached to the continuous parison 2 issuing from the extrusion head 1, as shown in chain-dotted lines in FIG. 1.

As a consequence of the cutting operation, the parison section 4 falls freely by gravity to the position shown in thick lines in FIGS. 1 and 2, whereafter the mold can be closed. In other words, the two halves 5 and 6 of the mold are then moved towards each other and trap the parison section 4 therebetween during its fall.

When the mold closing movement takes place, the lower portion of the parison section 4 is pinched between two edges 7 separating the mold impression or cavity proper 8 from a recess 9 provided at the bottom of the mold, in which a bottom plug is formed. This pinching of the lower portion of the parison section 4 causes a bottom wall 4a to be formed so as to close the lower portion of this parison section 4.

When the mold is closed, the upper end of the parison section 4 is level with a central blowing chamber 11 of relatively small dimensions which constitutes the uppermost portion of the mold impression or parison-shaping cavity 8. This blowing chamber 11 has one-half formed in each mold half 5, 6; on either side of this chamber 11, in each mold half, are a pair of recesses 12 and 13 followed out in the joint plane of the mold and separated from the central blowing chamber 11 by relevant edges 14 and 15 located in said joint plane.

Under these conditions, when the mold is closed, the upper portion of the parison section 4 is pinched between the edges 14 and 15 of the two mold halves and the excess thermoplastic material registering with recesses 12 and 13 is forced into these recesses to constitute therein the lugs or ears 4b and 4c assisting in holding the parison section 4 during the blowing operation. However, this mode of constituting the lugs 4b and 4c should not be considered in a limiting sense, for other ways of holding the parison section within the mold may be devised by those conversant with the art, for example by preliminary blowing the upper portion of the parison through the extrusion head in order to form in the parison a swollen portion for subsequently holding same in the mold.

In any case the central portion 4d of the upper end of the parison section 4 is not pinched and remains open to permit the blowing step.

This blowing step is accomplished by injecting into the blowing chamber 11 a compressed air jet directed towards the upper open aperture 4d of parison section 4, as shown by the arrow f. This air jet, which can be supplied immediately after closing the mold beneath the extrusion head 1, may be produced by different means. In the form of embodiment illustrated in FIGS. 1 and 2, this air jet is produced by means of a nozzle 16 formed symmetrically in the upper portions of the two mold halves 5 and 6 and opening into the blowing chamber 11. The axis of this nozzle 16 is substantially coincident with the mold axis, i.e., approximately with the axis of the extruded parison section 4. The compressed air injection nozzle 16 communicates via a passage 17 formed in one of the mold halves (in this example mold half 6) with a source of compressed air (not shown).

Under these conditions, immediately after closing the mold the blowing operation can be performed by supplying compressed air through the nozzle 16. The air jet issuing from the nozzle and directed towards the upper aperture 4d of the parison section will thus penetrate into the parison proper so as to inflate same and cause it to take the exact shape of the mold impression 8, due to the plasticity of the freshly extruded parison material.

If the upper end of the parison section 4 is slightly occluded the air jet will force a passage therethrough and inflate the parison under the same conditions.

Other forms of embodiment of the blowing device may be contemplated without departing from the basic principle of the invention. Thus, as shown diagrammatically in FIG. 4, a compressed air supply hose 18 may be secured within the mold half 6 so as to open in the axial direction through an air injection orifice 19 into the blowing chamber 11.

In the alternate form of embodiment shown in FIG. 5 an air injection pipe 21 is mounted in a radial direction within the blowing chamber 11 and communicates with a duct 22 formed in the wall of the mold half 6. The pipe 21 is bent at right angles so that its end portion 23 extends in a substantially axial direction towards the open end of parison section 4.

The air injection nozzle may if desired by arranged separately or detached from the mold halves and supported and moved independently thereof.

The member producing the necessary air jet under pressure may also be disposed, as far as its blowing section proper is concerned, externally of the blowing chamber 11. In this case, the blowing chamber 11 communicates with the exterior of the mold via a relatively large hole through which the compressed air jet can be blown towards the open end of the parison section.

Considering the specific case of the blowing of a bottle or like container as illustrated by way of example in the drawing the compressed air jet is directed towards the bottleneck extending either upwards, as shown in FIG. 1, or downwards when the blowing operation is to take place, as shown in FIG. 6.

In FIG. 6, the mold is illustrated in an upside-down position with respect to the position shown in FIG. 1. In this case the parison does not fall freely and is cut by the cutter 3 only after the former has been definitely enclosed in the mold. Its upper end is pinched between the edges 7 provided at the upper end of the mold halves and its open lower end is received in the blowing chamber 11 consisting, in this arrangement, of the lower portion of the mold impression 8. The underlying nozzle 16 produces an air jet directly upwardly, i.e., towards the open lower end of the parison section.

When the mold is blown from underneath, the recesses 12 and 13 formed in the arrangement illustrated in FIG. 1 are no more necessary for holding the parison since its lower portion can depend freely in the blowing chamber 11 as illustrated in FIG. 6.

The diameter of the parison 4 may be greater or smaller than that of the bottleneck. If the parison diameter were smaller than the bottleneck diameter, the parison is pinched in a longitudinal extension thereof beyond the neck, as already described hereinabove, so that the parison is safely prevented from falling to the bottom of the mold before it is blown from the top.

On the other hand, if the diameter of the parison is greater than that of the bottleneck, the parison is pinched in the joint plane of the mold at the neck level.

The collapse of the soft parison is safely prevented in the case of a bottom blowing arrangement (FIG. 6) since it is pinched at its upper end where the end extension is formed within the cavity 9.

The blowing chamber 11 may be fluidtight or not. If a fluidtight blowing chamber is used, it can be obtained by grinding the joint plane of the mold or through any other suitable and known method. However, the blowing chamber 11 may be rendered nontight on purpose, in order to ensure a renewal of the air contained in the blown article and a discharge of the distillates from the plastic material. At the limit, this chamber 11 may be open completely in case the injection of blowing or inflating compressed air takes place from the exterior.

The blowing device according to this invention is applicable to any type of machine for molding thermoplastic hollow bodies, notably machines wherein the molds are driven for intermittent or continuous rotation about a vertical or horizontal axis, or for continuous or intermittent translation, or alternately in the case of molds oscillating about a horizontal or vertical axis, etc.

Of course, various modifications and variations may be applied to the specific forms of embodiment of the present invention which are shown and described herein, without departing from the scope of the invention as defined in the appended claims.

What I claim is:

1. A device for blowing a hollow body of thermoplastic material manufactured by extrusion-blowing from a tubular parison extruded continuously in a vertical downward direction and cut into sections trapped in molds consisting each of two mutually movable portions and disposed beneath an extrusion head producing said parison, which comprises a blowing chamber of relatively reduced dimensions, formed in the two mold portions, at one end of the mold's impression, means to retain an open end of the parison section in said blowing chamber during the mold closing movement, a source of compressed gas and a compressed-gas injection nozzle connected to said source through one of the two portions of the mold and opening into said blowing chamber, said nozzle being disposed longitudinally to the mold and substantially coaxial therewith to direct the gaseous jet issuing therefrom into the blowing chamber in the direction of the open end of said parison and into said parison through its open end.

2. Device as set forth in claim 1, wherein said blowing chamber is formed in the upper end portion of the mold and the compressed-gas injection nozzle is arranged to direct the compressed gas jet downwards into said chamber.

3. Device as set forth in claim 1, wherein said blowing chamber is formed in the lower end portion of the mold and the compressed gas injection nozzle is arranged to direct the jet of compressed gas upwards into said chamber.

4. Device as set forth in claim 1, which comprises two recesses formed in each mold half on either side of the blowing chamber and adapted to receive the excess thermoplastic material during the mold closing step in order to form lugs for holding said parison section in the mold.

5. Device as set forth in claim 1, wherein said blowing chamber is fluidtight.

6. Device as set forth in claim 1, which comprises a relatively large orifice providing a communication between said blowing chamber and the exterior of the mold, the jet of compressed gas being adapted to be directed from the exterior of the mold through said orifice, into said parison.

7. Device as set forth in claim 1, which comprises a duct formed in one of said mold halves and connected to said source of gas under pressure, and an axial orifice in said duct which constitutes the compressed-gas injection nozzle.

8. Device as set forth in claim 1, which comprises a transverse end wall limiting said blowing chamber, an axial orifice formed through said end wall and constituting the compressed-gas injection nozzle, and a hose secured to the exterior of a half mold and connected to said axial orifice.

9. Device as set forth in claim 1, which comprises a pipe connected to said source of gas under pressure and opening into said blowing chamber, and an axial orifice of said pipe constituting the compressed-gas injection nozzle.

* * * * *